United States Patent [19]
Olvera-Hernandez et al.

[11] Patent Number: 6,094,579
[45] Date of Patent: Jul. 25, 2000

[54] SYSTEM AND METHOD OF MOBILE STATION PRESENCE VERIFICATION IN A MULTIPLE-HYPERBAND CELLULAR TELECOMMUNICATIONS NETWORK

[75] Inventors: Ulises Olvera-Hernandez, Djursholm, Sweden; Louis Segura, St. Laurent, Canada

[73] Assignee: Telefonaktiebolaget LM Ericsson (publ), Stockholm, Sweden

[21] Appl. No.: 09/009,055

[22] Filed: Jan. 20, 1998

[51] Int. Cl.⁷ ....................................................... H04Q 7/20
[52] U.S. Cl. .............................................. 455/437; 455/443
[58] Field of Search ..................................... 455/436, 437, 455/443, 439, 525; 370/331

[56] References Cited

U.S. PATENT DOCUMENTS

| 5,815,525 | 9/1998 | Smith et al. | 375/200 |
| 5,839,070 | 11/1998 | Lupien et al. | 455/440 |
| 5,878,349 | 3/1999 | Dufour et al. | 455/438 |
| 5,896,562 | 4/1999 | Heinonen | 455/76 |
| 5,920,459 | 7/1999 | Bruckert et al. | 370/331 |

FOREIGN PATENT DOCUMENTS

WO 97/14261  4/1997  WIPO .
WO 97/26771  7/1997  WIPO .

*Primary Examiner*—Nguyen Vo
*Assistant Examiner*—N. Mehrpour
*Attorney, Agent, or Firm*—Smith & Danamraj, P.C.

[57] ABSTRACT

A system and method of performing presence verification for a multiple-hyperband mobile station in a candidate cell for handoff in a multiple-hyperband cellular telecommunications network. The network includes a mobile switching center (MSC) and a plurality of cells, each of which operates in one of a plurality of hyperbands. A single verification device such as a location and verification module (LVM) is installed in each cell in the cellular network, each LVM operating in the cell's allocated hyperband. When a verification request is generated, the system determines whether the candidate cell has an LVM in the hyperband in which the mobile station is operating. If not, the system determines whether the candidate cell has an overlaid cell, and whether the overlaid cell has an LVM operating in the hyperband in which the mobile station is operating. If so, the system then utilizes the LVM of the overlaid cell to verify the presence of the mobile station in the candidate cell. The verification results are then reported to the MSC.

11 Claims, 5 Drawing Sheets

SYSTEM AND METHOD OF MOBILE STATION PRESENCE VERIFICATION IN A MULTIPLE-HYPERBAND CELLULAR TELECOMMUNICATIONS NETWORK

BACKGROUND OF THE INVENTION

1. Technical Field of the Invention

This invention relates to telecommunication systems and, more particularly, to a system and method of verifying mobile station presence in a given cell in a cellular telecommunications network capable of operating in multiple hyperbands.

2. Description of Related Art

North American cellular telecommunications networks traditionally operate in two frequency bands (A and B) in the 800-MHz hyperband, and are extending into C, D, and other bands. The most recent evolution in cellular telecommunications involves the adoption of six additiool frequency bands (A–F) in the 1900-MHz hyperband for use in handling mobile and personal communications. The 1900-MHz hyperband is also known as the Personal Communication Services (PCS) hyperband. Frequency bands within the 800-MHz hyperband and the 1900-MHz hyperband are defined in EIA/TIA Standard IS-136 and the PN3388-1 and PN3388-2 Specifications, which are hereby incorporated by reference herein. Other standards which define cellular telephone operations in North America include EIA-627, EIA-553, and the intersystem signaling standard ANSI-41 which are also incorporated by reference herein.

Each of the frequency bands specified for the cellular and PCS hyperbands is allocated a plurality of voice or speech channels and at least one access or control channel. The control channel is used to control or supervise the operation of mobile stations by means of information transmitted to and received from the mobile stations. Such information may include, but is not limited to, incoming call signals, outgoing call signals, page signals, page response signals, location registration signals, voice channel assignments, maintenance instructions, short message service (SMS) messages, and cell selection or reselection instructions as mobile stations travel out of the radio coverage of one cell and into the radio coverage of another cell. The voice channel is used to carry subscriber telephonic communications as well as messages requesting mobile station assistance in making hand-off evaluations. The control and voice channels may operate in either an analog mode or a digital mode.

Existing cellular telephone networks may simultaneously support radio telecommunications in multiple frequency hyperbands. For example, a mobile switching center (MSC) may control transmission and reception equipment at a base station to operate one cell in the 800-MHz hyperband and another cell in the 1900-MHz hyperband.

Operation in Existing Cellular Systems

Location, Presence Verification, and Handoff are three procedures utilized to hand over an ongoing call from cell to cell while maintaining high signal quality as a mobile station moves around in a cellular network. The purpose of the Location function is to find the cell with the best radio reception characteristics for a specific mobile station. The purpose of the Presence Verification function is to verify the presence of the mobile station in the new cell prior to handoff. The purpose of the Handoff function is to safely transfer an ongoing call from one cell to another that, according to the Location function, is better suited to handle the call. Handoffs may be performed between adjacent cells operating in the same or different hyperbands, or between overlaid cells operating in the same or different hyperbands such as between a 800-MHz cell and an overlaid 1900-MHz cell. Handoffs may also be performed between channels within the same cell.

The primary modes of operation of each mobile station are an idle operating mode and an on-call (busy) operating mode. In the idle operating mode, the mobile station stands by and awaits the receipt or initiation of a cellular telephone call, data delivery, short message service (SMS) delivery, or other orders. In the busy operating mode, the mobile station is being actively utilized by the subscriber to engage in a cellular telephone communication. While in the idle operating mode, the mobile station receives a list of neighboring cells (neighbor list) from the MSC via a communication that is broadcast from the serving base station. The neighbor list identifies neighboring cells (i.e., other base stations) that are available for cell reselection when the mobile station moves through the service area and passes across cell boundaries.

When a mobile station is in the busy operating mode, there are two alternative methods of performing handoffs from a first cell to a second cell, one method which utilizes mobile assisted handoff (MAHO) to perform the Location function and to identify when a handoff should be initiated, and one method which does not utilize MAHO.

Location Utilizing MAHO

For those networks that utilize MAHO, the mobile station performs the Location function. The mobile station receives on a dedicated channel, a neighbor list identifying neighboring cells from which the mobile station is to measure the signal strength. The mobile station measures the quality of the connection by measuring the bit error rate and the received signal strength on its assigned channel. The mobile station also measures the signal strength of channels in neighboring cells indicated in a Measurement Order from the base station. The Measurement Order includes measurement channels in neighboring cells. The channels are then ranked according to the signal strength received at the mobile station. These signal strength measurements are then utilized to assist the network in making a handoff determination and to identify the best candidate cell for handoff.

Location Without MAHO

In cellular networks that do not utilize MAHO to assist in the handoff process, location and verification modules (LVMs) perform the base station's portion of both the Location and Presence Verification functions. The LVMs are deployed in base stations throughout the network for measuring signal strengths from mobile stations in conversation state in neighboring cells. The LVMs in a particular base station operate on each hyperband operated by that base station and its neighbor cells. The signal strength measurements are provided to the MSC which determines the best candidate cell for handoff.

Presence Verification

Following the Location process and prior to handoff, the LVMs are utilized to perform a process known as Presence Verification in order to verify the presence of the mobile station in the cell which has been designated as the best candidate cell for handoff. A final signal strength measurement of the mobile station's signal is made in the candidate handoff cell and if the signal strength exceeds a predetermined threshold, the handoff is initiated. Presence verification may be performed with or without the use of MAHO to perform the location function.

Presence Verification is performed in the base station on order from the MSC. When operating on a digital traffic channel, the base station in the candidate cell for handoff is given the mobile station's old channel number, rate, time slot, and digital verification color code (DVCC), and is ordered to verify the mobile station's presence on the old channel. The base station measures the signal strength of the mobile station's signal on the old channel utilizing its LVM, decodes the DVCC to verify the mobile station's identity, and performs a comparison of the uplink and downlink signal strengths. When operating on an analog voice channel, signal strength is measured on the voice channel for the serving channel Supervisory Audio Tone (SAT). This information is reported to the MSC.

In systems that support operation in two frequency bands, and hands-off from one band to the other, a candidate cell operating in one band has to be able to perform Mobile Station Presence Verification (MSPV) in both bands. For this purpose LVMs for each band must be installed at the cell sites. In existing radio base stations, two LVMs are provided to perform mobile station Location and Presence Verification independently in the 800-MHz hyperband and the 1900-MHz hyperband. Thus, when a 800-MHz hyperband cell and a 1900-Mz hyperband cell are overlaid, the existing solution requires up to 4 LVMs (1 LVM for each hyperband for each cell) in the same geographical area. This implementation undesirably duplicates hardware and increases costs.

Although there are no known prior at teachings of a solution to the aforementioned deficiency and shortcoming such as that disclosed herein, PCT Patent Application WO 97/26771 to Rune (Rune), published Jul. 24, 1997, discusses subject matter that bears some relation to matters discussed herein. Rune discloses a method and apparatus for adaptive mobile station presence verification in a cellular system. Rune performs mobile station presence verification only for selected handoff requests between a first base station and a second base station. The handoff requests are selected based on the rate of mobile station presence verifications per handoff request. The rate of mobile station presence verifications per handoff request is adaptively changed based on the rate of unsuccessful verifications and the rate of unsuccessful handoffs per handoff request. Rune, however, does not teach or suggest any method or apparatus that enables fewer LVMs to be installed and utilized during the verification process.

Review of each of the foregoing references reveals no disclosure or suggestion of a system or method such as that described and claimed herein.

In order to overcome the disadvantage of existing solutions, it would be advantageous to have a system and method of mobile station presence verification that enables fewer LVMs to be installed and utilized during the verification process. The present invention provides such a system and method.

SUMMARY OF THE INVENTION

In one aspect, the present invention is a method of performing presence verification for a multiple-hyperband mobile station in a candidate cell for handoff. The method is performed in a multiple-hyperband cellular telecommunications network having a mobile switching center (MSC) and a plurality of cells. The method includes the steps of allocating each of the cells in the cellular telecommunications network to operate in one of a plurality of hyperbands, and installing a single verification device in each cell in the cellular network, each verification device operating in the cell's allocated hyperband. This is followed by determining whether the candidate cell has a verification device in the hyperband in which the mobile station is operating, and determining whether the candidate cell has an overlaid cell, upon determining that the candidate cell does not have a verification device in the hyperband in which the mobile station is operating. The method then determines whether the overlaid cell has a verification device operating in the hyperband in which the mobile station is operating, upon determining that the candidate cell has an overlaid cell, and then utilizes the verification device of the overlaid cell to verify the presence of the mobile station in the candidate cell, upon determining that the overlaid cell has a verification device opering in the hyperband in which the mobile station is operating.

In another aspect, the present invention is a system for performing presence verification for a multiple-hyperband mobile station in a candidate cell for handoff. The system is implemented in a multiple-hyperband cellular telecommunications network having a mobile switching center (MSC) and a plurality of cells. The system includes a base station in each of the cells in the cellular telecommunications network, each of the base stations operating in one of a plurality of hyperbands; and a verification device within each base station in the cellular network, each verification device operating in the same hyperband as the base station in which the device is located. The system also includes means within the candidate cell base station for determining whether the candidate cell base station has a verification device in the hyperband in which the mobile station is operating; and means within the MSC for determining that presence verification is needed in a different hyperband, upon determining that the candidate cell base station does not have a verification device in the hyperband in which the mobile station is operating. The system also includes means within the MSC for determining whether the candidate cell has an overlaid cell, upon determining that presence verification is needed in a different hyperband; and means within the MSC for determining whether the overlaid cell has a verification device operating in the hyperband in which the mobile station is operating. Finally, the system includes means within the MSC for directing the overlaid cell to utilize its verification device to verify the presence of the mobile station in the candidate cell, upon determining that the overlaid cell has a verification device operating in the hyperband in which the mobile station is operating.

BRIEF DESCRIPTION OF THE DRAWINGS

The invention will be better understood and its numerous objects and advantages will become more apparent to those skilled in the art by reference to the following drawings, in conjunction with the accompanying specification, in which.

DETAILED DESCRIPTION OF EMBODIMENTS

Figure 1:
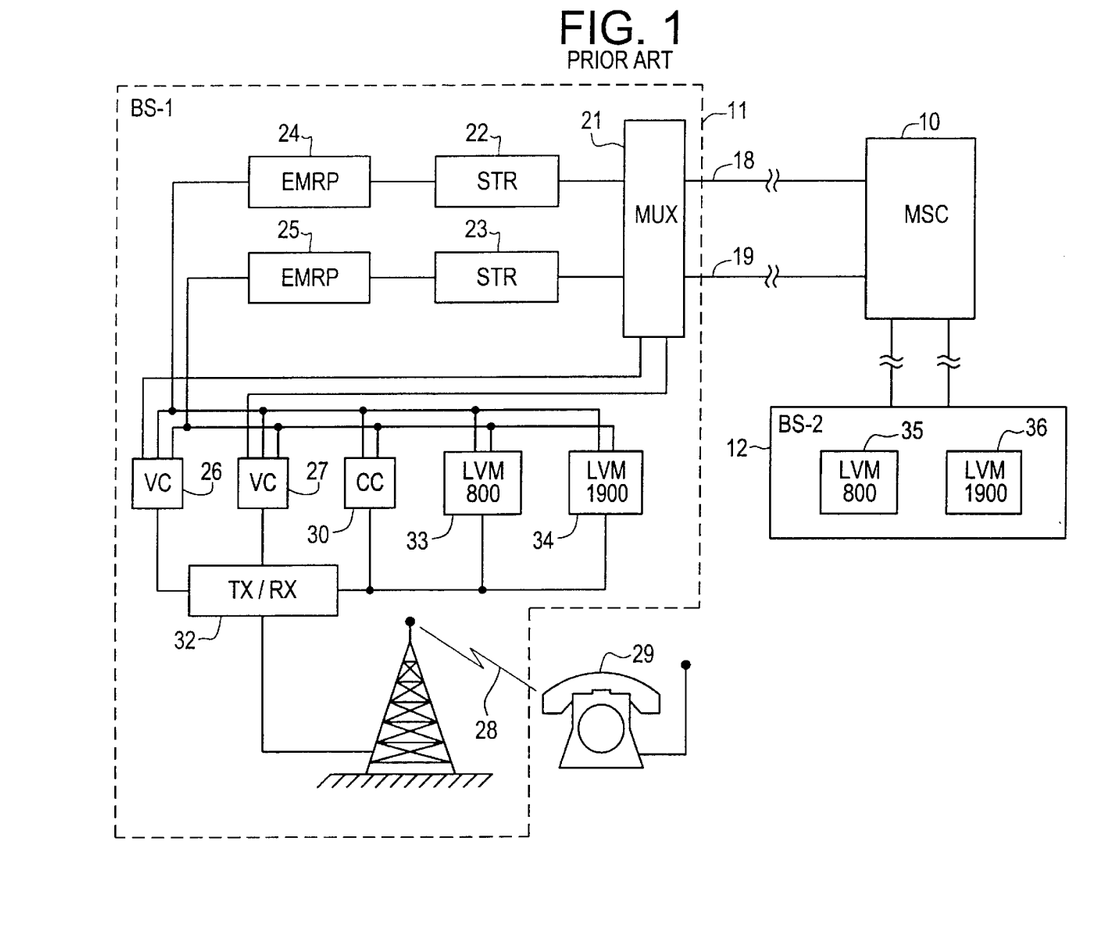
FIG. 1 (Prior Art) is a simplified block diagram of an existing radio base station illustrating the implementation of a separate location and verification module (LVM) for each hyperband.

FIG. 1 is a simplified block diagram of an existing radio base station (BS-1) 11 illustrating the implementation of a separate location and verification module (LVM) for each hyperband. Communications links 18 and 19 connect the MSC 10 to the remote base station 11 for common channel carrying of processor signaling message communications. In the base station 11, communications links 18 and 19 are connected to a multiplexer 21. The processor signaling messages carried on the communications links 18 and 19 for the common channel signaling system are then connected to signaling terminals (remote) 22 and 23 which are further connected to extension module regional processors 24 and 25. The multiplexer 21 extracts the formatted processor signaling messages from the communications links 18 and 19, and the connected signaling terminals (remote) 22 and 23 process and reformat the processor signaling messages for output to the extension module regional processors 24 and 25.

The subscriber communications carried on the communications links 18 and 19, on the other hand, are connected from the multiplexer 21 to a plurality of voice channel circuits 26 and 27 for facilitating subscriber communications over a wireless communications link 28 using mobile stations 29. The extension module regional processors 24 and 25 are also connected to the voice channel circuits 26 and 27, and are further connected to a control channel circuit 30 for facilitating the use of well known control message communications over the wireless link 28 between the base station 11 and the mobile stations 29.

The voice channel circuits 26 and 27, and the control channel circuit 30, are connected to a transmitter/receiver and filter which may be, for example, an auto-tune combiner (ATC) 32. In networks providing both 800-MD and 1900-MHz service, all the transmission equipment in each base station is either uniquely 800-MB or uniquely 1900-MHz equipment. Since a single MSC may control both 800-MHz and 1900-MHz cells through the same base station, two location and verification modules (LVMs) 33 and 34 are provided.

The MSC 10 is also connected to other base stations such as BS-2 (12). BS-2 is similar to BS-1 except that if BS-2 operates in a different frequency hyperband, its transmission equipment operates in the different hyperband. For simplicity, FIG. 1 only illustrates that BS-2 also includes two LVMs, an 800-MHz LVM 35, and a 1900-MHz LVM 36. Therefore, when BS-2 is a 1900-MHz cell overlaying an 800-MHz BS-1 cell, four LVMs are required to implement the two cells.

Figure 2:
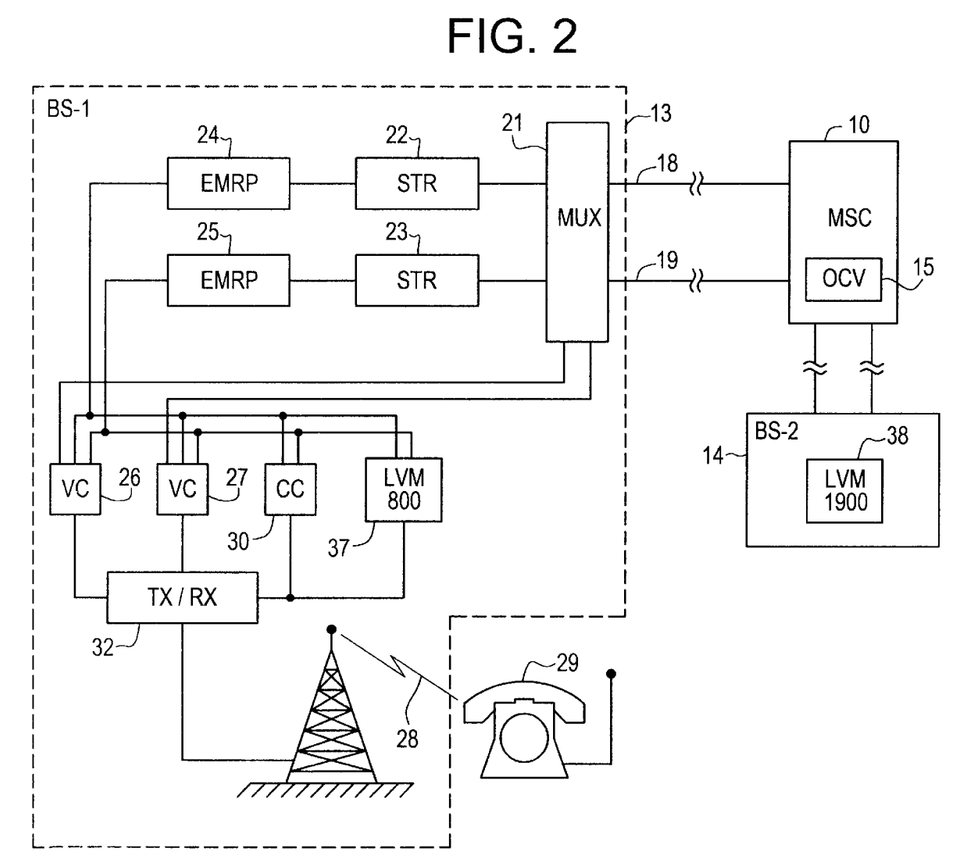
FIG. 2 is a simplified block diagram of a radio base station illustrating the implementation of a single LVM in accordance with the teachings of the present invention.

FIG. 2 is a simplified block diagram of a radio base station illustrating the implementation of a single LVM in accordance with the teachings of the present invention. In the system of the present invention, each base station includes only one LVM which operates in the frequency hyperband of the transmission equipment for that cell. Presence Verification for a mobile station operating in a different frequency hyperband is handled by the LVM associated with any overlaid cell operating in the different frequency hyperband. For example, in FIG. 2, an 800-MHz base station (BS-1) 13 includes an 800-MHz LVM 37. An overlaid 1900-MHz base station (BS-2) 14 includes a 1900-MHz LVM 38. When a dual-hyperband mobile station enters the cell of BS-1 while operating in the 800-MHz hyperband, the verification process is handled normally by LVM 37. When a dual-hyperband mobile station enters the cell of BS-1 while operating in the 1900-MHz hyperband, the verification process is controlled by an Overlaid Cell Verification (OCV) module 15 which directs the LVM 38 in BS-2 to perform the verification. The OCV module follows a process which is discussed below in more detail.

Figure 3:
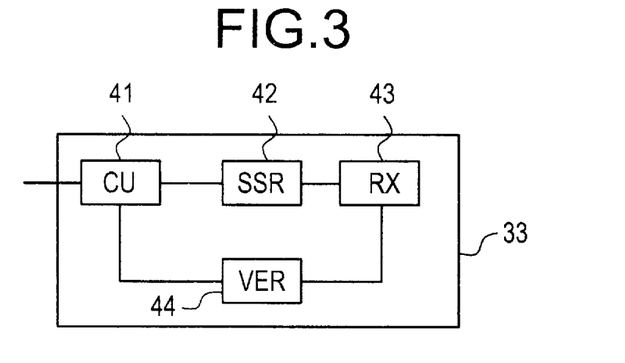
FIG. 3 is a high level block diagram of a first embodiment of the LVM of FIG. 2 which performs both cyclical location measurements as well as a verification signal strength measurement on demand.

FIG. 3 is a high level block diagram of a first embodiment of an LVM such as LVM 37 which performs both the cyclical location measurements as well as the verification signal strength measurement on demand. Each LVM comprises a control unit (CU) 41, a sig strength receiver (SSR) 42, a receiver (RX) 43, and a verification unit (VER) 44. The LVM 37 utilizes the SSR 42 to perform cyclical sampling measurements of radio signals received from mobile stations operating on voice channel frequencies allocated to neighboring cells. The results of the sampling measurements are updated in the CU 41 as a mean value (also considering previous measurements) after each sampling cycle. This mean value is provided to neighboring cells upon request in order to ascertain whether the cell operating the LVM 37 is a good candidate cell for handoff.

When the LVM is requested to perform a verification measurement, the CU 41 may interrupt the cyclical measurements by the SSR 42 for the VER 44 to perform the signal strength measurement.

Figure 4:
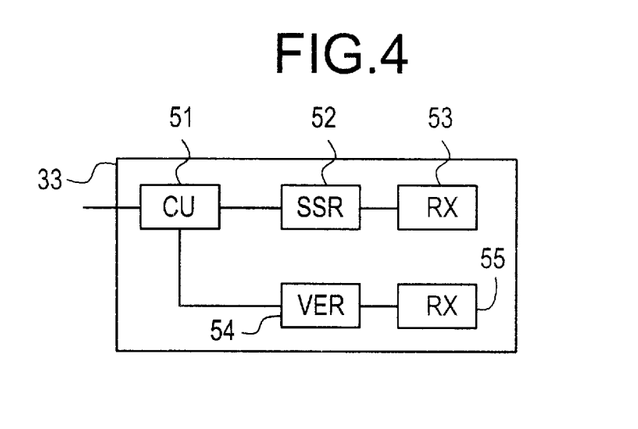
FIG. 4 is a high level block diagram of a second embodiment of the LVM of FIG. 2 which performs both cyclical location measurements as well as a verification signal strength measurement on demand.

FIG. 4 is a high level block diagram of a second embodiment of a LVM 37 which performs both the cyclical location measurements as well as the verification signal strength measurement. Once again, the LVM comprises a control unit (CU) 51, a signal strength receiver (SSR) 52, a receiver (RX) 53, and a verification unit (VER) 54. However, a second receiver 55 is added to the signal path for the verification function. The second receiver 55 and VER 54 may then perform the signal strength measurement for the verification function without interrupting the cyclical measurements of the SSR 52.

Figure 5:
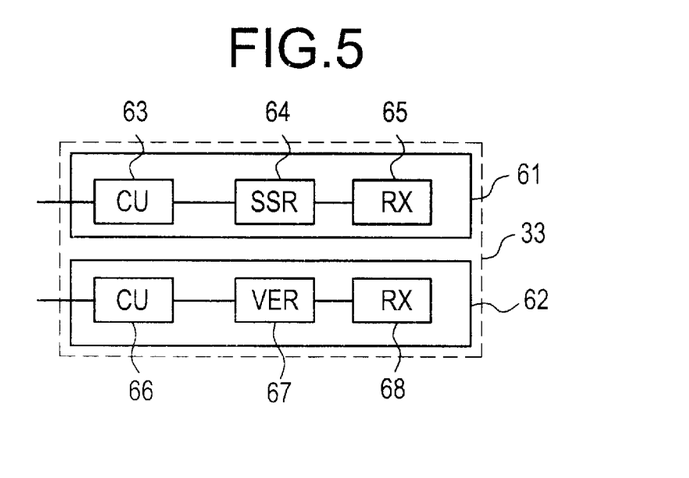
FIG. 5 is a high level block diagram of a third embodiment of the LVM of FIG. 2 which performs both cyclical location measurements as well as a verification signal strength measurement on demand.

FIG. 5 is a high level block diagram of a third embodiment of a LVM 37 which performs both the cyclical location measurements as well as the verification signal strength measurement. In this embodiment, the LVM 37 is divided into a location component 61 and a verification component 62 which are functionally independent. The location component includes a control unit (CU) 63, a signal strength receiver (SSR) 64, and a receiver (RX) 65. The verification component 62 includes a control unit (CU) 66, a verification unit (VER) 67, and a receiver (RX) 68. The verification component 62 then performs the signal strength measurement for the verification function without interrupting the cyclical measurements of the location component 61. While FIGS. 3–5 have shown various embodiments of a LVM, it should be understood that these embodiments are exemplary only, and LVMs other than those described may also be utilized with the present invention.

Figure 6A:
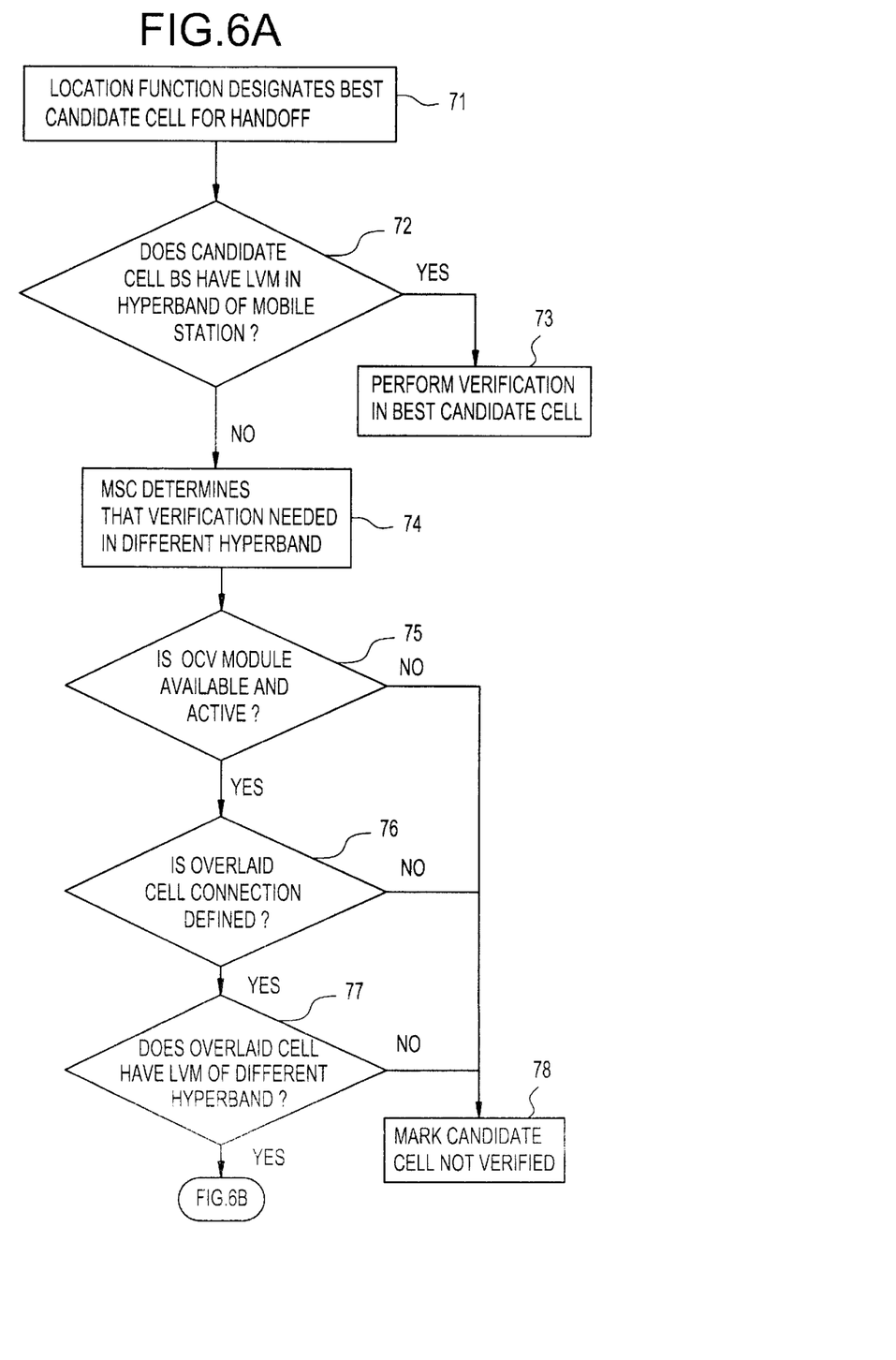
FIGS. 6A and 6B are a flow chart illustrating the steps in the presence verification process of the present invention.
Figure 6B:
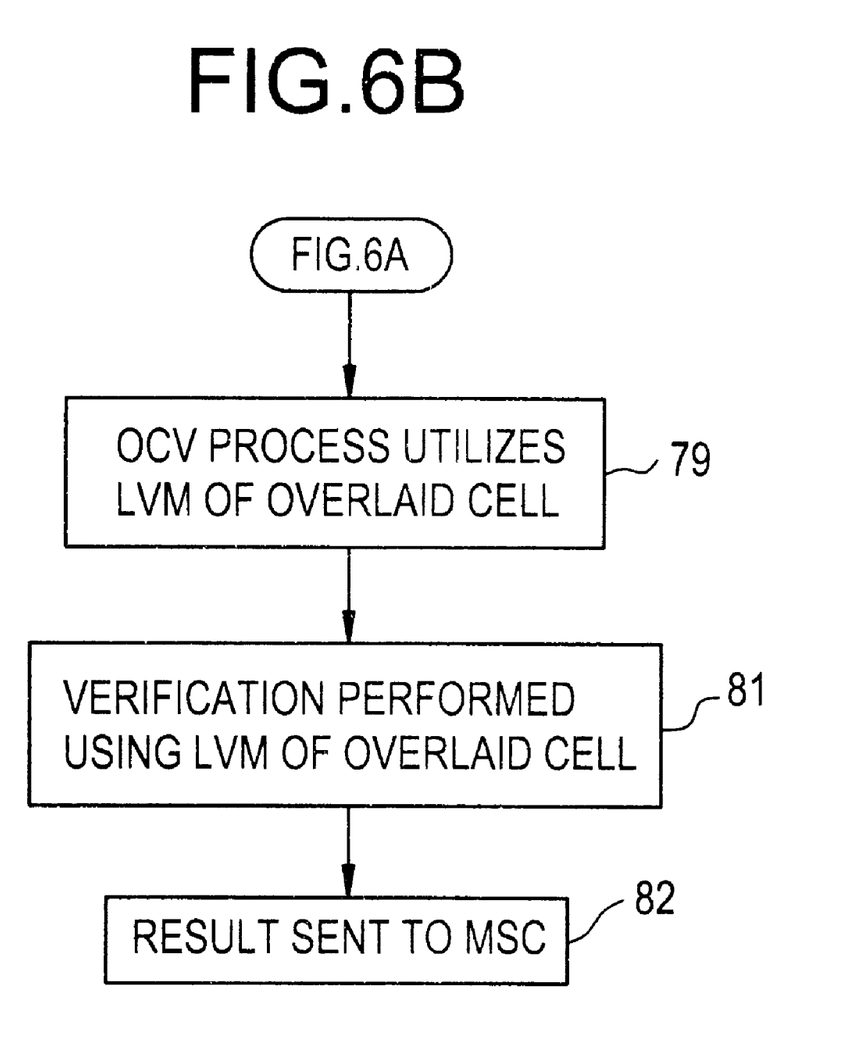

FIGS. 6A and 6B are a flow chart illustrating the steps in the Verification process utilized by the OCV module 15 (FIG. 2). In general the OCV process enables two overlaid cells to share a single LVM whenever the verification of a mobile station is to be performed in a candidate cell operating in a hyperband different from the serving cell (i.e., inter-hyperband verification). For an inter-hyperband verification, the verification is ordered in the overlaid cell if an LVM of the proper hyperband does not exist in the candidate cell. The accuracy of the OCV process depends on how closely the coverage areas of the overlaid cells match. The OCV process should preferably be implemented only for overlaid cells whose coverage areas are very similar.

Implementation of the OCV process requires changes to the interhyperband verification process. First, an administrative function is utilized to enable the operator to define a software connection between the two overlaid cells. Thereafter, overlaid-cell connection data is stored in a "OverlaidCells" table. At reception of a verification request, the verification process for candidate cells with the same hyperband as the serving cell is performed normally. For candidate cells operating in a hyperband that is different from the serving cell (inter-hyperband verification), the OCV process determines whether the candidate cell has an LVM of the same hyperband as the serving cell. If yes, the process continues the verification process as before. If there are no LVMs of the appropriate hyperband in that candidate cell the OCV process initiates the verification in the overlaid cell by determining:

a. whether the OCV process is available and active;

b. whether the candidate cell has an overlaid-cell connection defined; and    c. whether the overlaid cell has a LVM of the same hyperband as the serving cell.

If the answer to each determination is yes, the OCV process marks the candidate cell as not verified. However, if the LVM of the candidate cell is not of the same hyperband as the serving cell, the OCV process initiates the verification by utilizing the LVM of the overlaid cell. The OCV process coordinates the verification request sent to the LVM in the overlaid cell with the assignment of the verification result (e.g., successful or unsuccessful verification, timeout, blocking, etc.) to the candidate cell.

If the candidate list contains both a cell and that cell's overlaid cell, the OCV process only executes the verification for the cell with the same hyperband as the serving cell. The obtained verification result is then assigned to both candidate cells.

If the OCV process becomes unavailable while verification is being performed in an overlaid cell, the OCV process retains the overlaid-cell connection data until the results are received from the LVM. This can be done either by storing the overlaid-cell connection data in a task individual, or waiting for the reception of the results before clearing the overlaid-cell connection data from the OverlaidCells table.

Referring now to FIG. 6A, the OCV process begins after step 71 where the Location function designates a cell as the best candidate cell for handoff. The MSC 10 determines at step 72 whether the candidate cell base station has an LVM which operates in the hyperband of the mobile station. If yes, the process moves to step 73 where verification is performed normally in the candidate cell. If it is determined at 72 that the candidate cell base station does not have an LVM which operates in the hyperband of the mobile station, the process moves to step 74 where the MSC 10 determines that verification is needed in a different hyperband.

At steps 75, 76, and 77, the process determines whether the OCV module 15 is available and active, whether the candidate cell has a overlaid-cell connection defined, and whether the overlaid cell has a LVM of a different hyperband than the best candidate cell. If it is determined at 75 that the OCV module 15 is not available and active, the process moves to step 78 and mars the candidate cell as not verified (i.e., the verification process is not performed). It however, the OCV process is available and active, the process moves to step 76 where it is determined whether the candidate cell has a overlaid-cell connection defined. If not, the process moves to step 78 and marks the candidate cell as not verified. If, however, the candidate cell has a overlaid-cell connection defined, the process moves to step 77 where it is determined whether the overlaid cell has an LVM of a different hyperband than the best candidate cell. If not, the process moves to step 78 and marks the candidate cell as not verified. If, however, if it is determined at step 77 that the LVM of the candidate cell is not of the same hyperband as the serving cell, the OCV process moves to FIG. 6B, step 79 and initiates inter-hyperband verification. The verification is then performed at step 81 utilizing the LVM of the overlaid cell. At step 82, the results of the verification are then sent to the MSC 10.

It is thus believed that the operation and construction of the present invention will be apparent from the foregoing description. While the method, apparatus and system shown and described has been characterized as being preferred, it will be readily apparent that various changes and modifications could be made therein without departing from the spirit and scope of the invention as defined in the following claims.

What is claimed is:

1. In a multiple-hyperband celluar telecmunications network having a mobile switching center (MSC) and a plurality of cells, a method of performing presence verification for a multi-hyperband mobile station in a candidate cell for handoff, said method comprising the steps of:

allocating each of the cells in the cellular telecommunications network to operate in one of a plurality of hyperbands;

installing a single verification device in each cell in the cellular network, each verification device operating in the cell's allocated hyperband;

determining whether the candidate cell has a verification device in the hyperband in which the mobile station is operating;

determining whether the candidate cell has an overlaid cell, upon determining that the candidate cell does not have a verification device in the hyperband in which the mobile station is operating;

determining whether the overlaid cell has a verification device operating in the hyperband in which the mobile station is operating, upon determining that the candidate cell has an overlaid cell; and    utilizing the verification device of the overlaid cell to verify the presence of the mobile station in the candidate cell, upon determining that the overlaid cell has a verification device operating in the hyperband in which the mobile station is operating.

2. The method of performing presence verification of claim 1 further comprismg the step of verifying the presence of the mobile station in the candidate cell utilizing the verification device in the candidate cell, upon determining that the candidate cell has a verification device in the hyperband in which the mobile station is operating.

3. The method of performing presence verification of claim 1 further comprising, before the step of determining whether the candidate cell has an overlaid cell, the step of determining in the MSC whether overlaid cell presence verification is available and active.

4. The method of performing presence verification of claim 3 further comprising the step of marking the candidate cell "not verified" upon determining that overlaid cell presence verification is not available and active.

5. The method of performing presence verification of claim 1 further comprising the step of marking the candidate cell "not verified" upon determining that the candidate cell does not have an overlaid cell.

6. The method of performing presence verification of claim 1 further comprising the step of marking the candidate cell "not verified" upon determining that the overlaid cell does not have a verification device operating in the hyperband in which the mobile station is operating.

7. The method of performing presence verification of claim 1 further comprising the step of sending a result of the presence verification from the overlaid cell to the MSC.

8. In a multiple-hyperband cellular telecommunications network having a mobile switching center (MSC) and a plurality of cells, a method of performing presence verification for a multiple-hyperband mobile station in a candidate cell for handoff, said method comprising the steps of:

allocating each of the cells in the cellular telecommunications network to operate in one of a plurality of hyperbands;

installing a single verification device in each cell in the cellular network, each verification device operating in the cell's allocated hyperband;

determining whether the candidate cell has a verification device in the hyperband in which the mobile station is operating;

verifying the presence of the mobile station in the candidate cell utilizing the verification device in the candidate cell, upon determining that the candidate cell has a verification device in the hyperband in which the mobile station is operating;

determining that presence verification is needed in a different hyperband, upon determining that the candidate cell does not have a verification device in the hyperband in which the mobile station is operating;

determining whether overaid cell presence verification is available and active;

determining whether the candidate cell has an overlaid cell;

determining whether the overlaid cell has a verification device operating in the hyperband in which the mobile station is operating, upon determining that the candidate cell has an overlaid cell;

utilizing the verification device of the overlaid cell to verify the presence of the mobile station in the candidate cell, upon determining that the overlaid cell has a verification device operating in the hyperband in which the mobile station is operating; and sending a result of the presence verification from the overlaid cell to the MSC.

9. In a multiple-hyperband cellular telecommunications network having a mobile switching center (MSC) and a plurality of cells, a system for performing presence verification for a multiple-hyperband mobile station in a candidate cell for handoff; said system comprising:

a base station in each of the cells in the cellular telecommunications network, each of said base stations operating in one of a plurality of hyperbands;

a verification device within each base station in the cellular network, each verification device operating in the same hyperband as the base station in which the device is located;

means within the MSC for determining whether the candidate cell base station has a verification device in the hyperband in which the mobile station is operating;

means within the MSC for determining that presence verification is needed in a different hyperband, upon determining that the candidate cell base station does not have a verification device in the hyperband in which the mobile station is operating;

means within the MSC for determining whether the candidate cell has an overlaid cell, upon being notified that presence verification is needed in a different hyperband;

means within the MSC for determining whether the overlaid cell has a verification device operating in the hyperband in which the mobile station is operating; and means within the MSC for directing the overlaid cell to utilize the verification device of the overlaid cell to verify the presence of the mobile station in the candidate cell, upon determining that the overlaid cell has a verification device operating in the hyperband in which the mobile station is operating.

10. The system for performing presence verification of claim 9 wherein the verification device within each base station includes a signal strength receiver (SSR) which measures the signal strength of the mobile station in the candidate cell.

11. The system for performing presence verification of claim 9 wherein the verification device within each base station is a location and verification module (LVM) which performs both a location function and the presence verification function, the LVM comprising:

a signal strength receiver (SSR) for performing cyclical sampling measurements of radio signals received from mobile stations operating on voice channel frequencies allocated to neighboring cells;

a verification unit (VER) for measuring the signal strength of the mobile station in the candidate cell; and a control unit (CU) which interrupts the cyclical sampling measurements by the SSR and directs the VER measure the signal strength of the mobile station in the candidate cell.

* * * * *

UNITED STATES PATENT AND TRADEMARK OFFICE
CERTIFICATE OF CORRECTION

PATENT NO. : 6,094,579
DATED : July 25, 2000
INVENTOR(S) : Ulises Olvera-Hernandez et al.

It is certified that error appears in the above-identified patent and that said Letters Patent is hereby corrected as shown below:

Column

Column 1, line 19, delete "additiool" and substitute --additional-- therefor.
Column 6, line 20, delete "sig" and substitute --signal-- therefor.
Column 8, line 2, delete "mars" and substitute --marks-- therefor.
Column 8, line 3, delete "It" and substsute --If-- therefor.
Column 8, line 58, delete "comprisimg" and substitute --comprising-- therefor.

Signed and Sealed this

Twenty-ninth Day of May, 2001

Attest:

NICHOLAS P. GODICI

Attesting Officer

Acting Director of the United States Patent and Trademark Office